(12) United States Patent
Larsson et al.

(10) Patent No.: US 7,470,909 B2
(45) Date of Patent: Dec. 30, 2008

(54) DIRECTIONAL GAMMA RAY PROBE

(75) Inventors: Carey L. Larsson, Ottawa (CA); Harry Ing, Deep River (CA); Salah Djeffal, Deep River (CA); Hugh R. Andrews, Pembroke (CA); Ming Zhang, Ottawa (CA)

(73) Assignee: Her Majesty the Queen in right of Canada, as represented by the Minister of National Defence, Ottawa (CA)

( * ) Notice: Subject to any disclaimer, the term of this patent is extended or adjusted under 35 U.S.C. 154(b) by 0 days.

(21) Appl. No.: 11/509,078

(22) Filed: Aug. 24, 2006

(65) Prior Publication Data
US 2008/0048123 A1 Feb. 28, 2008

(51) Int. Cl.
*G01T 1/16* (2006.01)
(52) U.S. Cl. .................................. 250/370.09
(58) Field of Classification Search ............ 250/363.01, 250/370.09
See application file for complete search history.

(56) References Cited
U.S. PATENT DOCUMENTS

| | | | |
|---|---|---|---|
| 3,581,090 A * | 5/1971 | Brown .................... | 250/363.01 |
| 3,942,009 A | 3/1976 | Taylor | |
| 4,675,523 A * | 6/1987 | Garlick .................... | 250/252.1 |
| 5,081,362 A | 1/1992 | Vargo | |
| 5,345,084 A * | 9/1994 | Byrd ..................... | 250/390.12 |
| 5,665,970 A | 9/1997 | Kronenberg et al. | |
| 6,100,530 A | 8/2000 | Kronenberg et al. | |
| 7,304,309 B2 * | 12/2007 | Suhami ................. | 250/370.11 |
| 2005/0121618 A1* | 6/2005 | Fowler et al. ............... | 250/394 |
| 2006/0237654 A1* | 10/2006 | Srivastava et al. ...... | 250/370.11 |

OTHER PUBLICATIONS

S. Kronenberg, G.J. Brucker, E. Bechtel, and F. Gentner, "Directional Detector of Gamma Ray Sources," *Health Physics Society* 70(4):505-511; 1996.
K. Fujimoto, "A Simple Gamma Ray Direction Finder," *Health Physics Society* 91(1):29-35; 1996.

* cited by examiner

*Primary Examiner*—David P Porta
*Assistant Examiner*—Marcus H Taningco
(74) *Attorney, Agent, or Firm*—Stites & Harbison PLLC; Ross F. Hunt, Jr.

(57) ABSTRACT

A portable directional gamma ray radiation detector having a plurality of gamma ray radiation detectors separated by lead shielding arranged in an enclosure. Outputs from the detectors are applied to a signal processor to determine the location of a gamma ray emitter, and the signal processor is connected to a display device on the detector that indicates the direction to the gamma ray emitter.

6 Claims, 6 Drawing Sheets

DIRECTIONAL GAMMA RAY PROBE

FIELD OF THE INVENTION

The present invention relates to a radiation detector and, in particular to a portable directional radiation detector which indicates the direction of incident gamma radiation sources by angle and, consequently, facilitates the location of gamma radiation emitters.

BACKGROUND OF THE INVENTION

The detonation of a radiological dispersal device (a dirty bomb), the deliberate damaging of a radioisotope production facility or indeed many other terrorist scenarios could result in multiple fragments of radioactive material being strewn over an area in relatively close proximity to one another, requiring rapid remediation. The presence of multiple radioactive sources in an area poses a problem in the isolation and identification of the radioactive material by first responders. First responders have difficulty localizing radiation sources in a multi-source environment due to the isotropic nature of most conventional radiation detection equipment, thus prolonging the time spent in potentially high dose-rate areas resulting in an increased dose received by the first responders. Current radiation detection equipment is isotropic in response, thus providing little directional information to the user. Even in the case of a single isolated radioactive source, the isotropic detector response will only give an indication of source location by examining dose rate trends—i.e. by moving physically closer to it, which extends time and thus dose to users. A detector capable of indicating direction coupled with dose-rate and spectroscopic information is not generally available, but is needed for improved nuclear radioisotope search missions with handheld instrumentation.

In close proximity to the source, the use of pancake probes to detect the associated beta emissions (very close to the ground or source), the use of collimated detectors, and the use of electronic methods are current solutions available to address this issue, however all have associated short-comings. At a distance, methods such as coded aperture imaging and Compton imaging have shown the ability to directionally identify a radioactive source's location in real-time.

The current solutions mentioned above have serious limitations. The use of pancake probes to detect the associated beta emissions (very close to the ground or source) will result in even more gamma dose to the responders; the use of collimated detectors will demand an unacceptable mass increase—i.e. the detector becomes to heavy to be considered portable; and the use of electronic methods, such as modified composite scintillator assembly systems (such as a phosphor sandwich), are not suitable at higher energies owing to particle range considerations. Monte Carlo simulations to investigate the feasibility of using a phosphor sandwich design clearly demonstrated their poor directional response and poor spectroscopic identification ability. Further to this, methods such as coded aperture imaging and Compton imaging require directional detection to be performed at a significant distance from the source, thus requiring the user to approach using conventional methods in order to remediate the scene. These systems are also typically large and bulky, currently transportable but not man-portable.

U.S. Pat. No. 5,665,970 by Stanley Kronenberg et al describes one type of directional radiation detector and imager where a pancake Geiger-Mueller counter is surrounded or sandwiched between two materials having different atomic numbers such as a thin layer of lead on one side and a layer of Lucite™ on an opposite side. The direction of a radiation source can then be calculated by rotating the detector but this takes time which increases the dose rate received by a person operating the detector.

SUMMARY OF THE INVENTION

It is an object of the present invention to provide a portable radiation detector which indicates the direction of incident gamma radiation from an emitter by angle to accurately facilitate the localization of that emitter.

A directional gamma radiation detector, according to one embodiment of the present invention, comprises a portable enclosure containing at least three gamma radiation detectors separated by shielding for gamma radiation, outputs from the radiation detectors being connected to a signal processor to determine the angle to a source of gamma radiation from the outputs and an output from the signal processor being connected to a display device on the detector that indicates the angle to the source of gamma radiation.

BRIEF DESCRIPTION OF THE DRAWINGS

Preferred embodiments of the invention will now be described in more detail with reference to the accompanying drawings, wherein.

DESCRIPTION OF A PREFERRED EMBODIMENT

Figure 1:
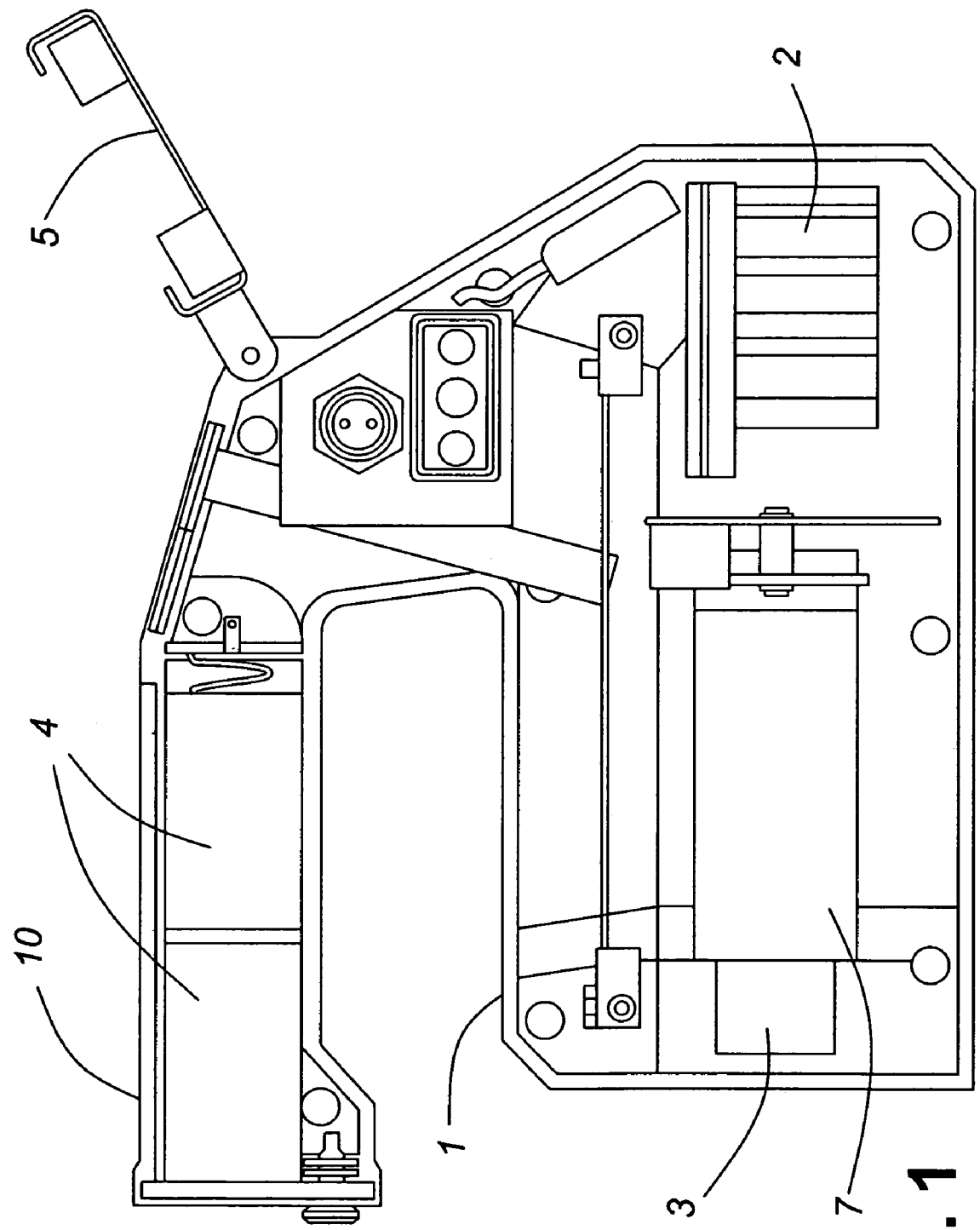
FIG. 1 is a perspective view, partially cut away, of a portable gamma radiation detector according to the present invention.
Figure 2:
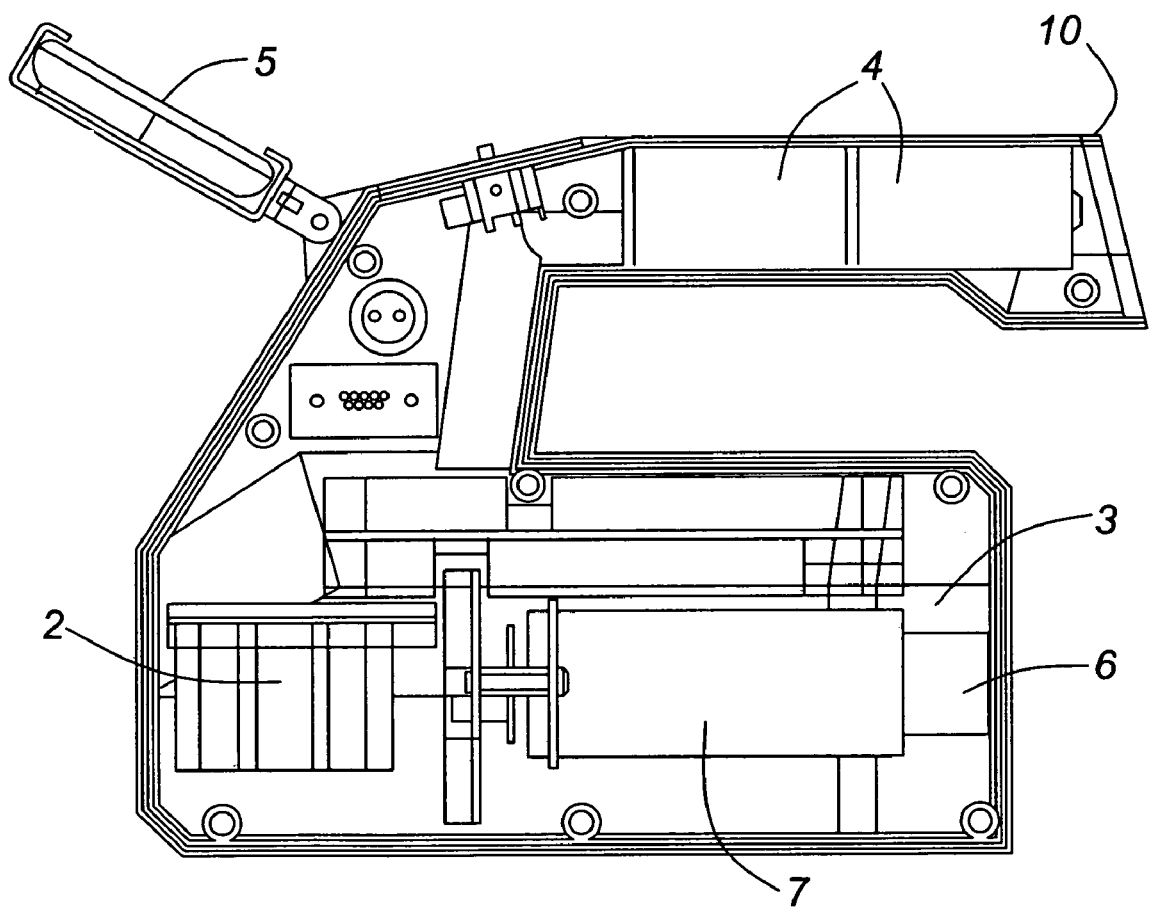
FIG. 2 is a cross-sectional view of the detector shown in FIG. 1.

The detonation of a radiological dispersal device (a dirty bomb), the deliberate damaging of a radioisotope production facility or indeed many other terrorist scenarios could result in multiple fragments of radioactive material being strewn over an area in relatively close proximity to one another, requiring rapid remediation. The presence of multiple radioactive sources in an area poses a problem in the isolation and identification of the radioactive material by first responders. First responders have difficulty localizing radiation sources in a multi-source environment due to the isotropic nature of most conventional radiation detection equipment, prolonging the time spent in potentially high dose-rate areas leading to an increased dose received by the first responders. Current radiation detection equipment is isotropic in response, thus providing little directional information to the user. Even in the case of a single isolated radioactive source, the isotropic detector response will only give an indication of source location by examining dose rate trends—i.e. by moving physically closer to it, which extends time and thus dose to users. A detector capable of indicating direction coupled with dose-rate and spectroscopic information is not generally available, but is needed for improved nuclear radioisotope search missions with handheld instrumentation.

In close proximity to the source, the use of pancake probes to detect the associated beta emissions (very close to the ground or source), the use of collimated detectors, and the use of electronic methods are current solutions available to address this issue, however all have associated short-comings. At a distance, methods such as coded aperture imaging and Compton imaging have shown the ability to directionally identify a radioactive source's location in real-time.

The current solutions mentioned above have serious limitations. The use of pancake probes to detect the associated beta emissions (very close to the ground or source) will result in even more gamma dose to the responders; the use of collimated detectors will demand an unacceptable mass increase—i.e. the detector becomes to heavy to be considered portable; and the use of electronic methods, such as modified composite scintillator assembly systems (such as a phosphor sandwich), are not suitable at higher energies owing to particle range considerations. Monte Carlo simulations to investigate the feasibility of using a phosphor sandwich design clearly demonstrated their poor directional response and poor spectroscopic identification ability. Further to this, methods such as coded aperture imaging and Compton imaging require directional detection to be performed at a significant distance from the source, thus requiring the user to approach using conventional methods in order to remediate the scene. These systems are also typically large and bulky, currently transportable but not man-portable.

U.S. Pat. No. 5,665,970 by Stanley Kronenberg et al describes one type of directional radiation detector and imager where a pancake Geiger-Mueller counter is surrounded or sandwich between two materials having different atomic numbers such as a thin layer of lead on one side and a layer of Lucite™ on an opposite side. The direction of a radiation source can then be calculated by rotating the detector but this takes time which increases the dose rate received by a person operating the detector.

The directional gamma ray probe according to the present invention as illustrated in FIG. 1 is a unique, single-hand operated portable, lightweight gamma detector for use in a high gamma-ray field, to locate multiple fragments of radioactive material strewn over an area. This gamma ray probe contains two sensors, one (sensor 2) to provide directional information and the other (sensor 3) for spectroscopy which are housed in a plastic molded enclosure 1 designed to meet weather resistant requirements and decontamination considerations. Information displayed is via a commercial-off-the-shelf (COTS) weather resistant personal data assistant (PDA) 5 with specialized software to indicate the direction of a radiation source, spectral and dosimetric information as well as a user location via an on board GPS.

Figure 3:
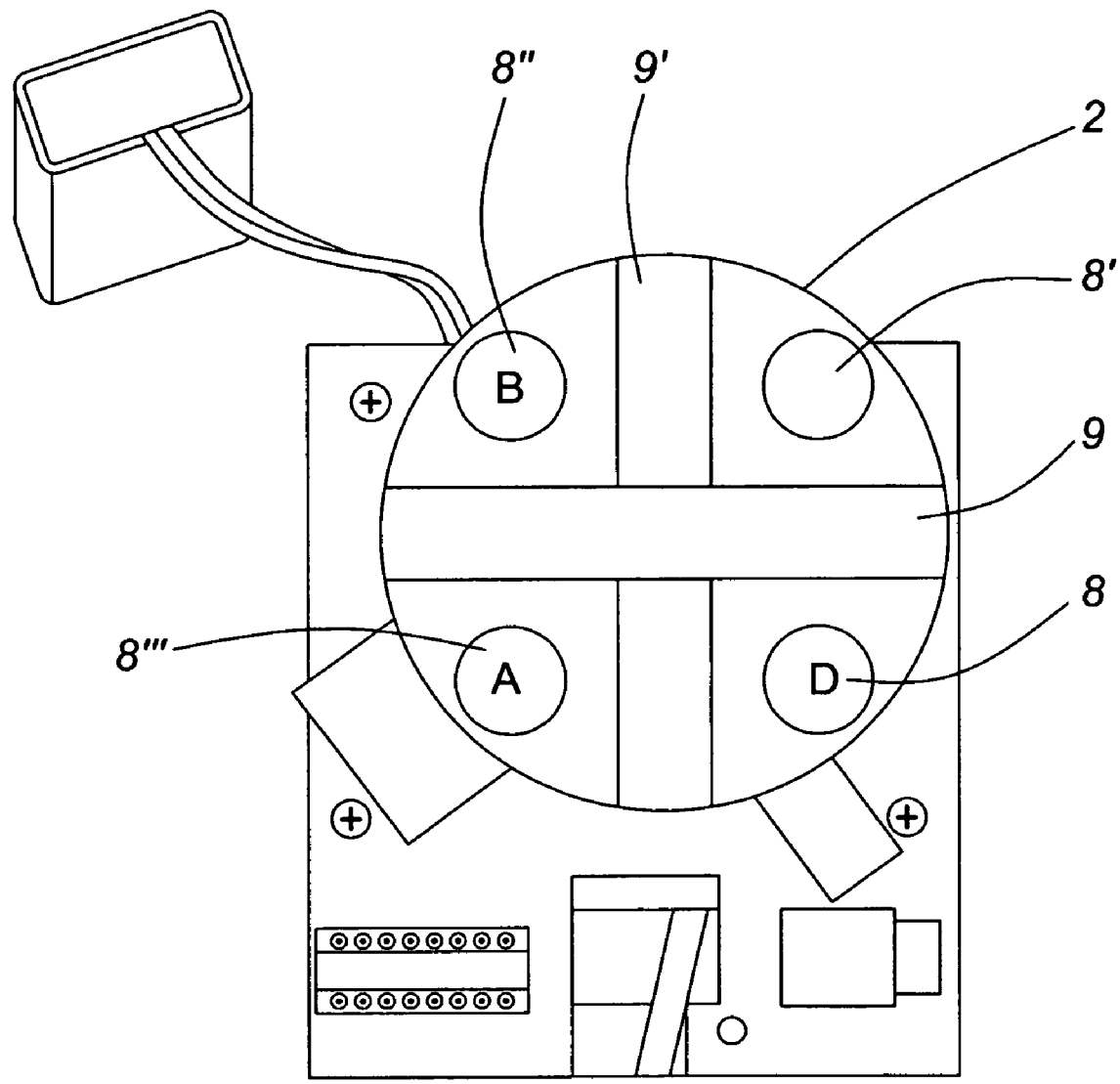
FIG. 3 is a perspective top view of the directional detector elements in the radiation detector according to the present invention.
Figure 4:
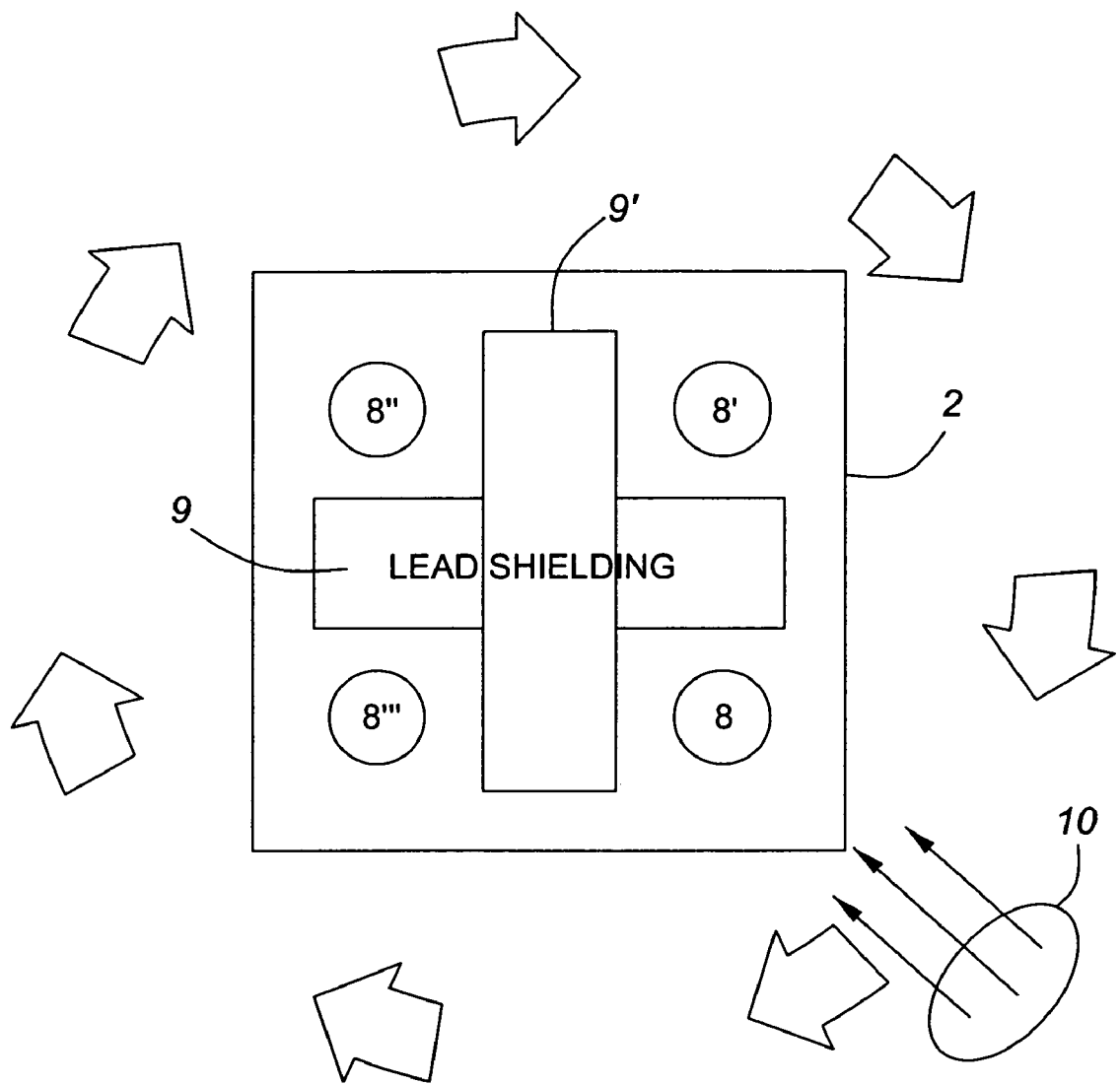
FIG. 4 is a schematic top view of the elements illustrated in FIG. 3.

The directional sensor 2 consists of at least three radiation detectors separated by gamma ray shielding. The prototype detector has four miniature Geiger Muller tubes(GMTs) 8, 8', 8" and 8'" positioned in quadrants as illustrated in the top view in FIG. 4 and perspective view of FIG. 3 separated by lead (Pb) shielding 9, 9'. The size of the GMTs was optimized to ensure adequate operation within the dose-rate range of less than 1 µ/Sv/hr to more than 10 mSv/hr with a dose rate limit of approximately 100 mSv/hr. A suitable size of the GMTs was max/effective length=2.2"/1.6" and max/effective diameter=0.67"/0.57". These have a $^{137}$Cs photons response=140 cpm/µSv.h$^{-1}$ (2.33 cps/µSv.h$^{-1}$). Directional information can be determined via software from the outputs of the four GMTs and displayed as a wedge pointing to the gamma ray emitter on the screen of the PDA 5. The detector closest to a radiation source will have the highest counting rate and the detector furthest away will have the lowest counting rate due to the effect of inverse square with distance (especially when the source is close) and the effect of the lead shielding on the response of the furthest detector.

Directional information of source location detected by the radiation probe according to the present invention is derived from continuous measuring outputs of each GMT using software algorithms and displayed as a wedge on the PDA 5 pointing toward the source.

In order to confirm theoretical Monte Carlo calculations of the angular response for the present invention's directional sensors, the directional sensor and corresponding electronics were mounted on a rotating table. A 130 mCi Cesium-137 source was placed at the same height of the table at a distance of 2 meters from the sensor which resulted in a dose rate of approximately 180 µSv/hr at the sensor's location. Readings were taken in twenty second intervals at 30° rotational increments of the table. The results in Table 1 below indicate a positive location to within ±7.5°.

TABLE 1

| Actual Angle ° | Calculated Angle ° | Difference |
| --- | --- | --- |
| 0 | −3.95 | −3.95° |
| 30 | 34.78 | 4.78° |
| 60 | 53.84 | −6.16° |
| 90 | 91.21 | 1.21° |
| 120 | 124.12 | 4.12° |
| 150 | 142.54 | −7.46° |
| 180 | 177.18 | −2.82° |
| 210 | 214.71 | 4.71° |
| 240 | 235.25 | −4.75° |
| 270 | 274.49 | 4.49° |
| 300 | 307.43 | 7.43° |
| 330 | 323.80 | −6.20° |
| 360 | 356.05 | −3.95° |

The spectroscopy sensor 3 is located at one end of enclosure 1 next to directional sensor 2 and consisted of a scintillator crystal 6 coupled to a tiny 1" photo multiplier tube 7. The scintillator crystal is preferably a small (½"×½") LaBr$_3$ (Ce) crystal since it is about 7 times faster than NaI(Tl) with a high light output i.e. 63 photons/keV versus 38 photons/keV for NaI(Tl) and timing properties very close to the fastest scintillation crystal BaF$_2$. A LaBr$_3$ (Ce) crystal has excellent linearity of light generation with energy with a maximum deviation at low energy of <5% and gives high energy resolution.

Other currently available hand-held isotope identifiers become "swamped" in high radiation fields due to deadtime effects. Due to the small size and high energy resolution of the LaBr$_3$ sensor, it allows spectroscopy measurements and identification to be performed in fields up to 10 mSv/h.

The unfamiliarity of first responders with radiation detectors and identification equipment often results in misuse of the detectors resulting in errors. The requirement for calibration of most detectors before each use is sometimes not performed resulting in misidentified or unidentified isotopes.

Figure 5:
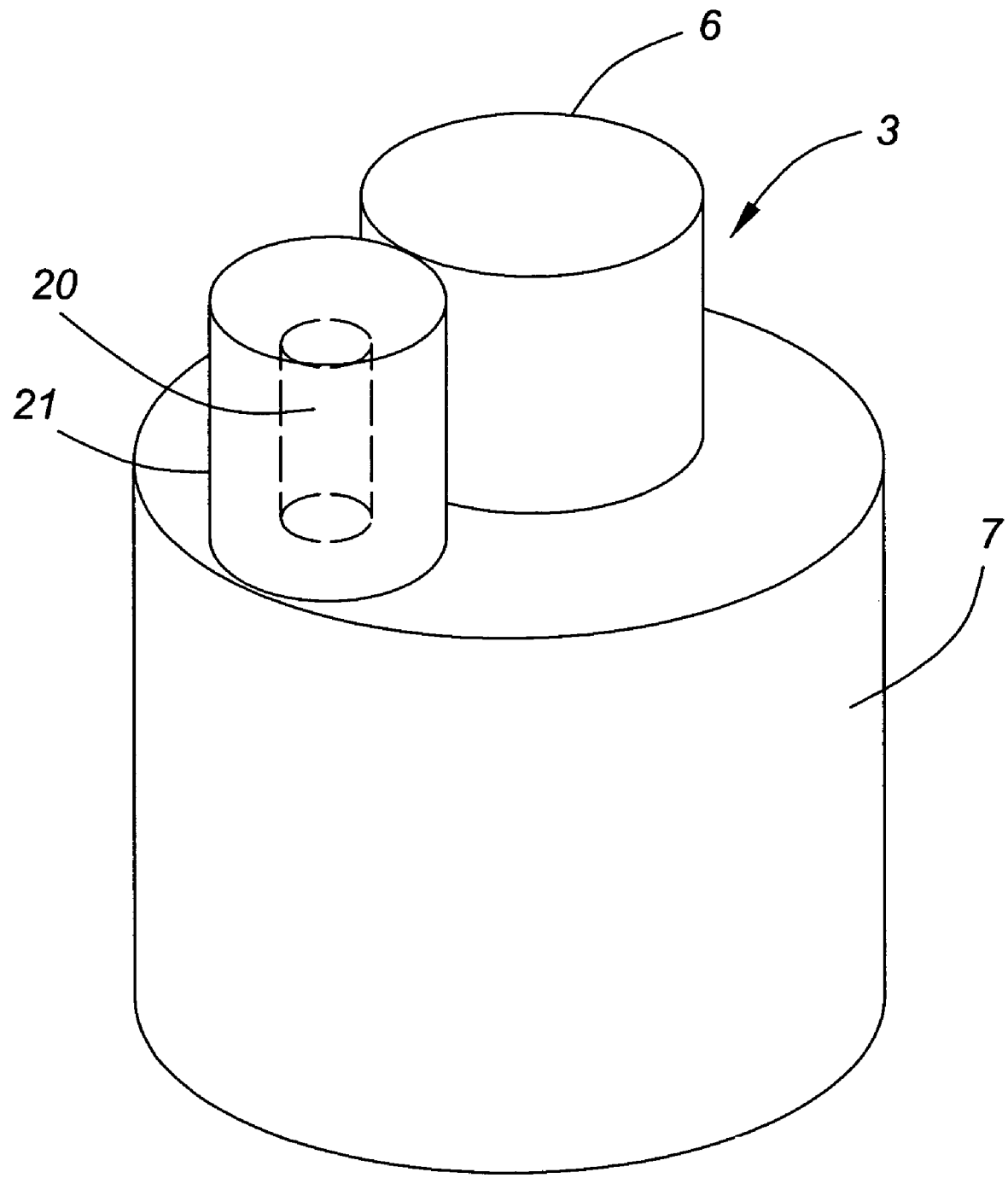
FIG. 5 is a side view of the spectroscopy sensor shown in FIG. 1.
Figure 6:
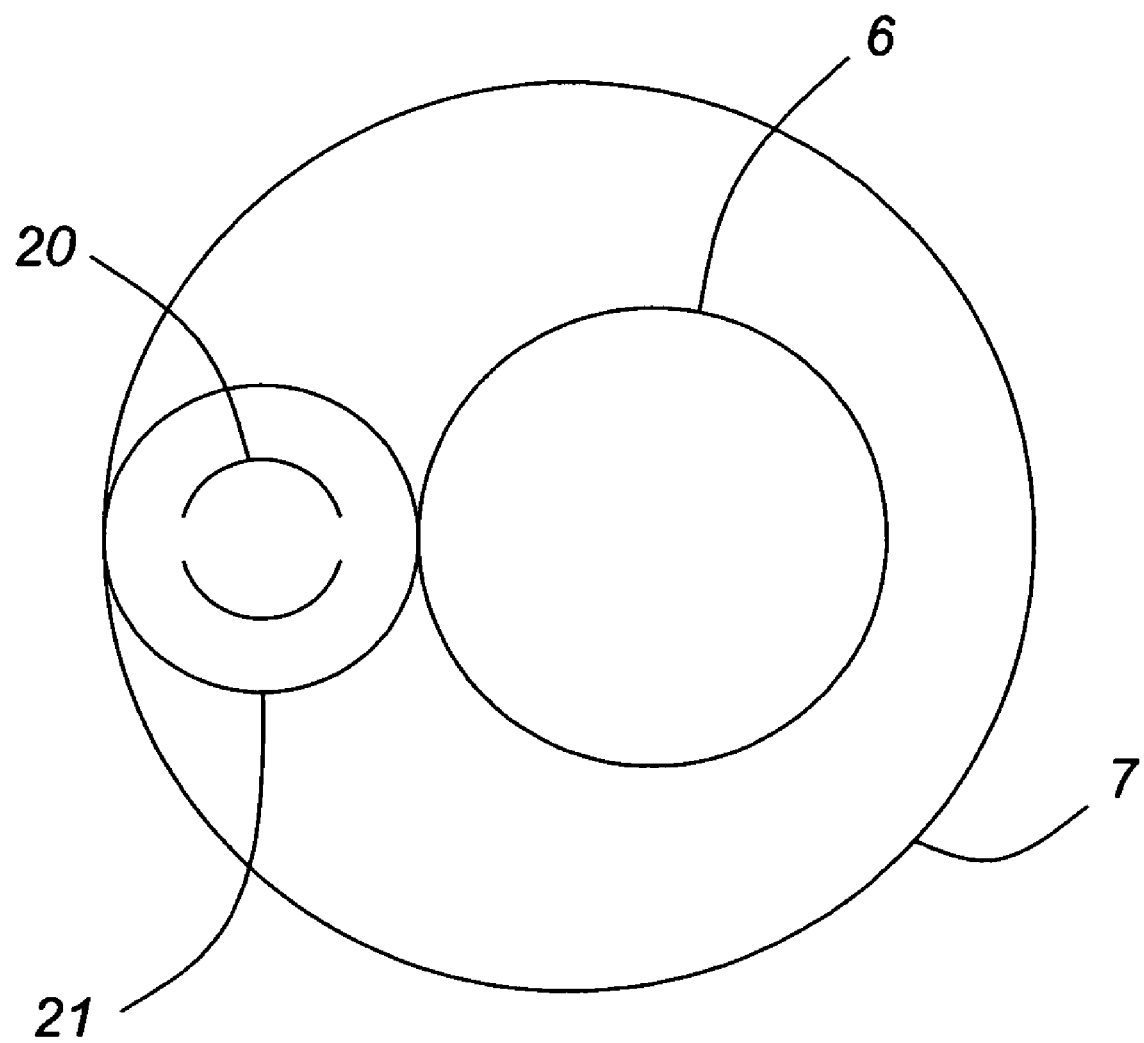
FIG. 6 is an end view of the sensor shown in FIG. 5.

In order to simplify operation of the spectroscopy sensor 3, a self-calibrating device is used removing the need for calibration before entry into a hot-zone. The auto-calibration feature for the LaBr$_3$ crystal 6 is implemented by calibration source 20 in a lead-shield 21 located adjacent to the LaBr$_3$ crystal 6 on the small PMT 7 as illustrated in FIGS. 5 and 6. The calibration source 20, consisting of a small droplet of $^{241}$Am on a NaI(Tl) crystal produces consistent light pulses in the crystal that are measured by the PMT which allows calibration to be updated continuously. Software techniques are used to efficiently separate the calibration source signal from other signals generated by the LaBr$_3$ crystal based on their time signatures, which ensures that it is always calibrated and ready-to-use.

Power for this gamma ray probe is supplied by batteries 4 located in a handle 10 for enclosure 1. A spectroscopic display from the spectroscopy sensor 3 can be routed to the PDA display 5 by a switch, which allows users to collect and save a spectrum, select a region of interest and perform an automatic identification of the selected peak. Dose rate information can be displayed on both the directional display and the spectroscopic display. The PDA display 5 can be rotated "up" when in use or "down" when not in use.

An additional feature of the directional gamma ray probe according to the present invention is its data transmission options since it is equipped with user selected wireless (Blue Tooth) or wired (RS232) data transmission. The wireless capability introduces features of communication with more than one PDA. A single detector can, as a result, transmit data to its connected PDA 5, which has both read and write capability, as well as to other PDAs having a "read-only" ability to see the measured data on the display. For instance, an additional "read-only" PDA might be in the hands of an incident commander outside of a hot-zone, providing real-time indication of radiation fields in a hot-zone. This probe also has a RS232 port to allow it to be mounted on robotic platforms and allow readings to be made without a user being located in a hot-zone.

This prototype directional gamma ray probe length is 10.509" and its lower enclosure height is 4.350" with a weight of about 5 kg.

Various modifications may be made to the preferred embodiment without departing from the spirit and scope of the device as defined in the appended claims.

The user's location can be located via an on board GPS to which the PDA 5 is scrolled to view a GPS screen display for instance.

The embodiment of the invention in which an exclusive property or privilege is claimed are defined as follows:

1. A portable directional gamma ray radiation detector comprising an enclosure for at least three gamma ray radiation detectors separated by shielding for gamma radiation, outputs from the gamma ray detectors being connected to a signal processor to determine an angle towards a source of gamma rays with an output from the signal processor being connected to a display device on the detector that indicates an angle to a source of gamma rays, wherein a spectroscopy sensor comprising a scintillator crystal coupled to a photo multiplier tube is located in the enclosure, an output from the photo multiplier tube being connected to a signal processor to determine a spectrum for the gamma ray, the signal processor's output being directed to the display device which can be scrolled to display a spectrum of the gamma rays emitted by the source of gamma rays, wherein a GPS is located in the detector whose output can be directed to the display device which can be scrolled to display the detector's location, and wherein the detector is provided with wireless data transmission to transmit data from the display device to other detectors at remote locations.

2. A portable directional gamma ray radiation detector as defined in claim 1, wherein said at least three gamma ray radiation detectors are Geiger Muller tubes positioned in a cluster and the shielding is lead (Pb) sheets located in a space between the Geiger Muller tubes.

3. A portable directional gamma ray radiation detector as defined in claim 1, wherein the spectroscopy sensor is self calibrating.

4. A portable directional gamma ray radiation detector as defined in claim 3, wherein a calibration source is located adjacent to the scintillator crystal on an input to the photo multiplier tube, the calibration source comprising of a droplet of $^{241}$Am on a NaI(Tl) crystal, all of which are shielded from the scintillator crystal by lead (Pb) shielding.

5. A portable directional gamma ray radiation detector as defined in claim 1, wherein the scintillator crystal is a cerium-activated lanthanum bromide crystal.

6. A portable directional gamma ray radiation detector as defined in claim 1, wherein the detector is provided with a port to allow the detector to be mounted on a robotic platform.

\* \* \* \* \*